(12) United States Patent
Sugaya et al.

(10) Patent No.: US 6,913,055 B2
(45) Date of Patent: Jul. 5, 2005

(54) LAMINATION SYSTEM

(75) Inventors: Kenji Sugaya, Kiryu (JP); Kensuke Shoji, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/910,314

(22) Filed: Aug. 4, 2004

(65) Prior Publication Data
US 2005/0039859 A1 Feb. 24, 2005

(30) Foreign Application Priority Data

Aug. 22, 2003 (JP) ........................................ 2003-298935

(51) Int. Cl.⁷ .............................................. B32B 31/00
(52) U.S. Cl. .................... 156/359; 156/555; 156/582; 156/583.1
(58) Field of Search ..................... 156/64, 350, 359, 156/555, 580, 582, 583.1; 100/327, 155 R, 160, 176

(56) References Cited

U.S. PATENT DOCUMENTS

| | | | | |
|---|---|---|---|---|
| 5,232,538 A | * | 8/1993 | Liu | 156/359 |
| 5,476,568 A | * | 12/1995 | Marion et al. | 156/359 |
| 5,571,368 A | * | 11/1996 | Barge | 156/359 |
| 5,783,024 A | | 7/1998 | Forkert | |
| 5,807,461 A | | 9/1998 | Hagstrom | |
| 5,810,965 A | * | 9/1998 | Fwu | 156/359 |
| 6,159,327 A | | 12/2000 | Forkert | |
| 6,264,774 B1 | * | 7/2001 | Lenz et al. | 156/64 |

* cited by examiner

Primary Examiner—James Sells
(74) Attorney, Agent, or Firm—Birch, Stewart, Kolasch & Birch, LLP

(57) ABSTRACT

A lamination system comprises a thermocompression bonding means for bonding laminate films on top and/or back surfaces of cards, applying heat and pressure using a pair of heat rollers. The lamination system is provided with contact type temperature detection devices for detecting surface temperatures of the heat rollers and a heat roller attaching/detaching device for attaching or detaching the heat rollers. The heat roller attaching/detaching device places the temperature detection devices in contact with surfaces of the heat rollers when the heat rollers are being installed in the lamination system, and places the temperature detection devices apart from the heat rollers when the heat rollers are to be attached to, or detached from, the lamination system.

8 Claims, 6 Drawing Sheets

LAMINATION SYSTEM

This Non-provisional application claims priority under 35 U.S.C. § 119(a) on Patent Application No(s). 2003-298935 filed in Japan on Aug. 22, 2003, the entire contents of which are hereby incorporated by reference.

BACKGROUND OF THE INVENTION

1. Field of the Invention

The present invention relates to a lamination system for thermocompression bonding of laminate films, each having a heat adhesive layer, on top and/or back surfaces of ID cards or the like. More specifically, this invention relates to the lamination system provided with contact type temperature detection devices for detecting surface temperatures of heat rollers.

2. Description of the Prior Art

Recently, ID cards of various types are being widely used. In order to protect an ID card from tampering or to improve the life of the ID card, a transparent film of about 30 μm in thickness is laminated by a thermocompression bonding on a surface of the ID card on which information data are printed. Lamination systems such as disclosed in U.S. Pat. No. 5,807,461, U.S. Pat. No. 5,783,024 or U.S. Pat. No. 6,159,327 are known as systems suitable for such lamination.

In the lamination system disclosed in U.S. Pat. No. 5,807,461, a transparent film pre-cut in a predetermined shape (a patch) is mounted on a carrier (a base sheet). The carrier is provided with sensor marks (index markings) for detecting the position of the pre-cut patch on the carrier. The lamination system detects the sensor mark prior to the lamination to detect the position of the pre-cut patch, then tears the patch from the carrier and laminates the patch on a surface of a printed ID card by thermocompression bonding. Such lamination system is undesirable in view of the operational cost and the environmental protection, since the carrier is thrown away as a waste material.

In a lamination system disclosed in U.S. Pat. No. 5,783,024 in which the above mentioned problem is solved, a leading edge of a continuous transparent laminate film is drawn out from a supply roll, then transferred along a film transfer path, and then cut into a predetermined length. The cut laminate film is further transferred along the film transfer path to a convergence zone. On the other hand, a card to be laminated with the cut film is put into the lamination system, after being printed by a card printer. The card is also transferred along a card transfer path to the convergence zone. The cut laminate film is laid on the card at the convergence zone. The cut laminate film and the card are then transferred to a thermocompression bonding part, where they are bonded with each other by thermocompression bonding using a heat roller or heat rollers provided there.

Such lamination system is advantageous in view of the operational cost and the environmental protection, since the laminate film is used after being cut in a necessary length, and consequently, no waste carrier such as in the lamination system disclosed in U.S. Pat. No. 5,807,461 is left. So, such lamination system is called wasteless type lamination system.

Further, in U.S. Pat. No. 6,159,327, a lamination system for laminating both surfaces of a card using a pair of lamination systems similar to that disclosed in U.S. Pat. No. 5,807,461 is disclosed.

In these lamination systems, surface temperature of a heat roller needs to be controlled appropriately according to the material of a card to be laminated. At present, such surface temperature control is being made, in general, estimating the surface temperature based on temperature information obtained by a temperature detection device placed inside of the heat roller. However, for more accurate control of the surface temperature, it is desirable to directly measure the surface temperature. Direct measurement of the surface temperature can be done by a temperature detection device comprising a contact type temperature element, such as a thermistor for example, contacting slidably with the surface of the heat roller.

In the meantime, it sometimes happens that a heat roller in a lamination system is contaminated or damaged by a foreign substance such as a burr of a card edge for example. Consequently, a contaminated or damaged heat roller needs to be detached for cleaning, or it needs to be exchanged with another one in some cases.

However, in case that a temperature detection device is provided in contact with a surface of a heat roller, it is difficult to detach the heat roller from, or attach the heat roller to, the lamination system, with the temperature detection device in its installed position. Further, in case that the temperature detection device is detached each time when the heat roller is detached from, or attached to, the lamination system, the temperature detection device is liable to be damaged.

SUMMARY OF THE INVENTION

It is therefore an object of the present invention to provide a lamination system in which surface temperatures of heat rollers can be accurately controlled using temperature information obtained by contact type temperature detection devices for detecting surface temperatures of heat rollers, and in which the heat rollers can be easily attached to, or detached from, the lamination system without giving damage to the temperature detection devices.

A lamination system according to a preferred embodiment of the present invention to achieve the above object comprises a thermocompression bonding means for bonding laminate films, each having a heat adhesive layer, on top and/or back surfaces of cards, applying heat and pressure using a pair of heat rollers, wherein contact type temperature detection devices for detecting surface temperatures of the heat rollers and a heat roller attaching/detaching device for attaching or detaching the heat rollers are provided, the heat roller attaching/detaching device places the temperature detection devices in contact with surfaces of the heat rollers when the heat rollers are being installed in the lamination system, and places the temperature detection devices apart from the heat rollers when the heat rollers are to be attached to, or detached from, the lamination system.

With the lamination system described above, since the contact type temperature detection devices for detecting surface temperatures of the heat rollers are provided, it is possible to accurately control the surface temperatures of the heat rollers using temperature information obtained by the temperature detection devices. Further, since the heat roller attaching/detaching device places the temperature detection devices in contact with surfaces of the heat rollers when the heat rollers are being installed in the lamination system, and it places the temperature detection devices apart from the heat rollers when the heat rollers are to be attached to, or detached from, the lamination system, the heat rollers can be easily attached to, or detached from, the lamination system without giving damage to the temperature detection devices.

In carrying out the invention in one preferred mode, the heat roller attaching/detaching device comprises support plates for supporting the temperature detection devices respectively, and each of the support plates is attached rotatably around an axis parallel to the rotational axis of each of the heat rollers.

Further in carrying out the invention in one preferred mode, each of the support plates has a side plate opposing to a side end surface of the corresponding heat roller, and the side plate prevents the heat roller from running out of the installed position.

Further in carrying out the invention in one preferred mode, the heat roller attaching/detaching device comprises support plates for supporting the temperature detection devices respectively and a cap attached removably to a frame structure of the lamination system, each of the support plates is attached to the frame structure rotatably around an axis parallel to the rotational axis of each of the heat rollers, each of the support plates is provided with a spring that urges the support plate to turn to place the temperature detection device apart from the heat roller, and the cap has guide teeth for turning the support plates, opposing to the spring forces of the springs, when the cap is attached to the frame structure, so as to make the temperature detection devices contact respectively with the surfaces of the heat rollers.

Further in carrying out the invention in one preferred mode, the temperature detection device comprises a thermistor temperature transducer.

DETAILED DESCRIPTION OF THE INVENTION

Figure 1:
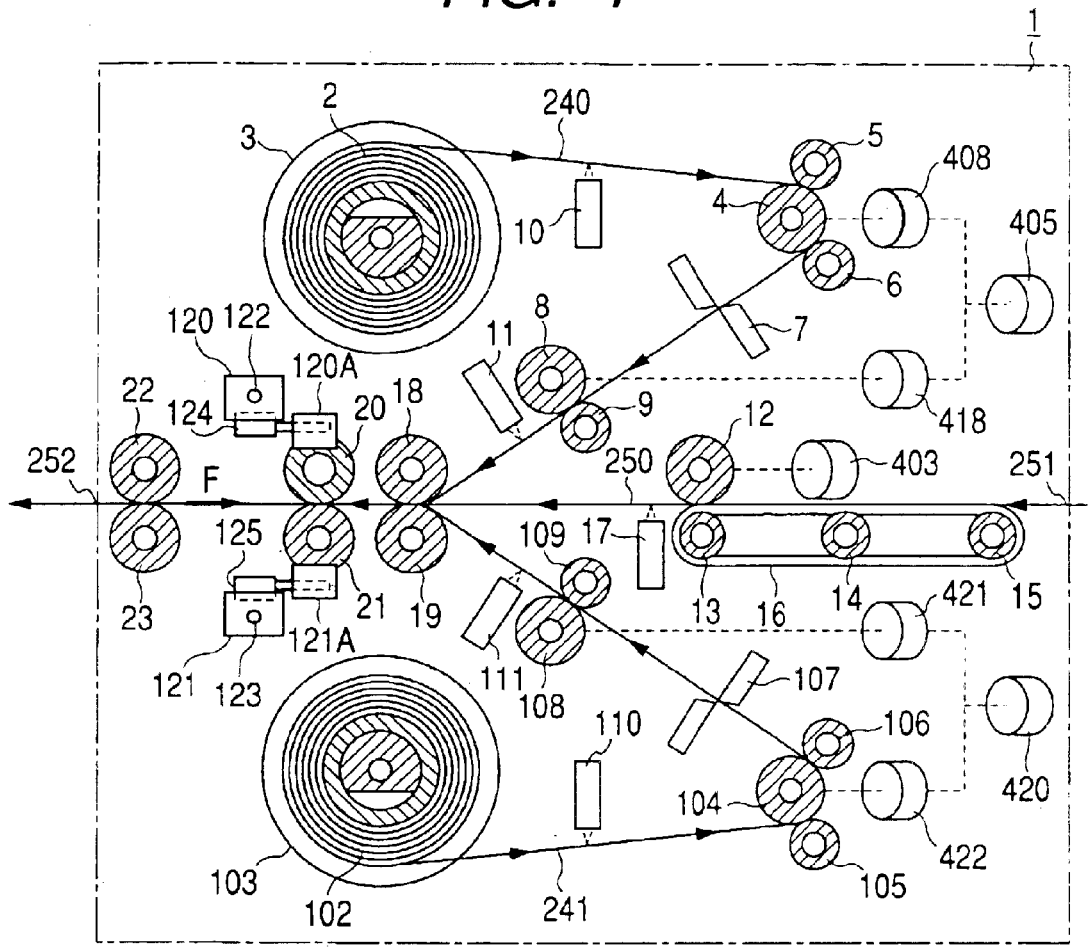
FIG. 1 is a schematic view of a lamination system according to an embodiment of the present invention.

FIG. 1 is a schematic view of a lamination system 1 according to an embodiment of the present invention. The lamination system 1 of which overall construction is shown in FIG. 1 is an system for making lamination on both surfaces of ID cards.

A transparent continuous laminate film with a heat adhesive layer on a surface is loaded in a form of a laminate roll 2 on a supply spindle 3. A leading edge of the continuous laminate film is drawn out from the laminate roll 2 and transferred along a film transfer path 240.

A laminate film supply monitoring sensor 10 composed of an optical sensor such as a reflective type optical sensor, for example, is provided along the film transfer path 240 and monitors the supply of the continuous laminate film.

The continuous laminate film is transferred, passing through rollers 4, 5 and 6, two cutting blades of a cutter 7, rollers 8, 9, and under a film detection sensor 11 composed of an optical sensor such as a reflective type optical sensor, for example.

Distance L between the cutter 7 and the film detection sensor 11 is set to be a predetermined design value of the system.

Another film transfer path 241 is provided in the other side of a card transfer path 250, that will be explained later, approximately symmetrically to the film transfer path 240 about the card transfer path 250. Another transparent continuous laminate film with a heat adhesive layer on a surface is loaded in a form of a laminate roll 102 on a supply spindle 103. A leading edge of the continuous laminate film is drawn out from the laminate roll 102 and transferred along the film transfer path 241.

A laminate film supply monitoring sensor 110 composed of an optical sensor such as a reflective type optical sensor, for example, is provided along the film transfer path 241 and monitors the supply of the continuous laminate film.

The continuous laminate film is transferred, passing through rollers 104, 105 and 106, two cutting blades of a cutter 107, rollers 108, 109, and under a film detection sensor 111 composed of an optical sensor such as a reflective type optical sensor, for example.

Distance L between the cutter 107 and the film detection sensor 111 is set to be a predetermined design value of the system.

On the other hand, a printed ID card made of a synthetic resin is put into an inlet 251 of the lamination system 1. Then, the printed ID card is transferred on a belt 16 driven by rollers 13 to 15, then transferred along the card transfer path 250 being held by a part of the belt 16 on the roller 13 and a roller 12 opposing to the belt 16. The printed ID card is further transferred to a point of convergence, composed of rollers 18 and 19, at which the film transfer path 240, the film transfer path 241 and the card transfer path 250 converge, after being positioned for registration using a detection signal detected by a card edge detection sensor 17 composed of an optical sensor such as a reflective type optical sensor, for example.

Drive force of a laminate film transfer motor 405 is transmitted to the roller 4 through a laminate load electric clutch 408. The drive force is further transmitted to the rollers 5, 6 through the roller 4 and the respective gears (not illustrated). Similarly, the drive force is also transmitted to the roller 8 through a laminate feed electric clutch 418, and from the roller 8 to the roller 9 through gears (not illustrated).

In this embodiment, a stepping motor is adopted as the laminate film transfer motor 405. Since an amount of rotation of the stepping motor can be precisely and easily controlled by controlling a number of drive pulses, amounts of rotation of the roller 4 and the roller 8 can also be precisely and easily controlled.

Further, by combining on/off controls of the laminate load electric clutch 408 and the laminate feed electric clutch 418 with the rotation control of the motor, transfer of the laminate film can be made more minutely.

Also in the film transfer path 241, similarly to that in the film transfer path 240, drive force of a laminate film transfer motor 420 is transmitted to the roller 104 through a laminate load electric clutch 422. The drive force is further transmitted to the rollers 105, 106 through the roller 104 and the respective gears (not illustrated). Similarly, the drive force is also transmitted to a roller 108 through a laminate feed electric clutch 421, and from the roller 108 to a roller 109 through gears (not illustrated).

The printed ID card is transferred by drive force of a card transfer motor 403. By also adopting a stepping motor as the card transfer motor 403, transfer of the card can be minutely controlled by controlling a number of drive pulses for the stepping motor.

Drive force of the card transfer motor 403 is transmitted to the roller 12, and then from a drive shaft (not illustrated) of the roller 12 to the rollers 13, 18, a heat roller 20 and a roller 22 through such as gears and/or synchronous belts (not illustrated). The drive force is further transmitted from these rollers to rollers opposing to these rollers through the respective gears (not illustrated).

Additionally, the laminate film transfer motors 405, 420 can be omitted. In this case, the drive force of the card transfer motor 403 is transmitted to the rollers in the film transfer systems through appropriate electric clutches. Further, a servomotor with a number of rotation sensor such as a rotary encoder can be used as the drive source in place of the stepping motor.

Figure 2:
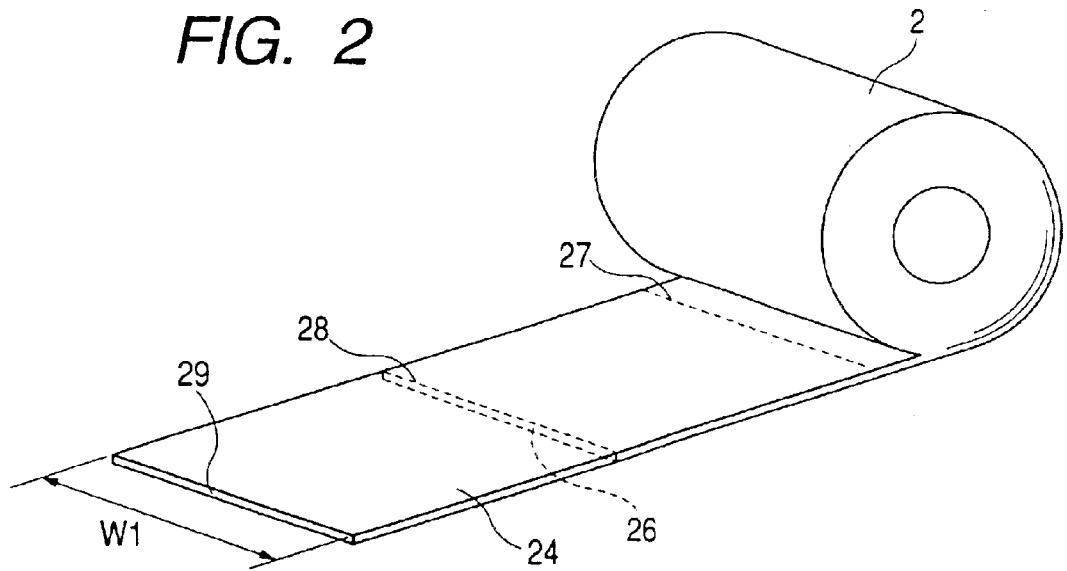
FIG. 2 is a schematic perspective view of an example of a laminate roll of a continuous laminate film of which a leading edge is drawn out from the laminate roll.

FIG. 2 is a schematic perspective view of an example of a laminate roll 2 of a continuous laminate film 24 of which a leading edge 29 is drawn out from a laminate roll 2. As shown, the leading edge 29 of the continuous laminate film 24 having width W1 is drawn out from the laminate roll 2 and cut successively along a cutting line 28, a cutting line 27 and so forth by the cutter 7. The continuous laminate film 24 may be a transparent film, or may be a film treated to have a hologram surface for preventing from forgery.

Figure 3:
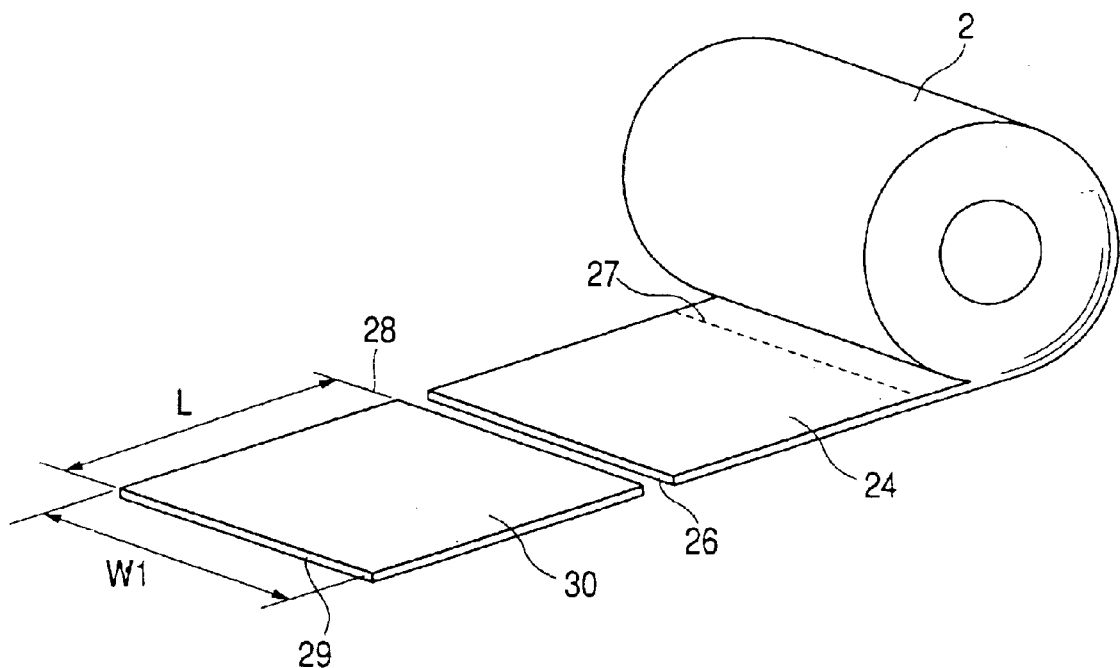
FIG. 3 is a schematic perspective view of the laminate roll of the laminate film in FIG. 2 after the laminate film is cut from the laminate roll.

FIG. 3 is a perspective view of the cut laminate film 30. As shown, the continuous laminate film 24 is cut along the cutting line 28 at a distance L from the leading edge 29. A cut edge 26 becomes a new leading edge of the continuous laminate film 24 to be cut next.

Another continuous laminate film to be used for laminating another surface of the card is also drawn out from the laminate roll 102 and cut similarly.

Each of the cut laminate films 30 is laid on the top or back of the printed ID card respectively at the aforementioned point of convergence. Then, the printed ID card and the cut laminate films 30 are transferred to a place between the heat roller 20 and another heat roller 21 (FIG. 1) composing a thermocompression bonding means provided at the downstream and are laminated there by thermocompression bonding.

Figure 4:
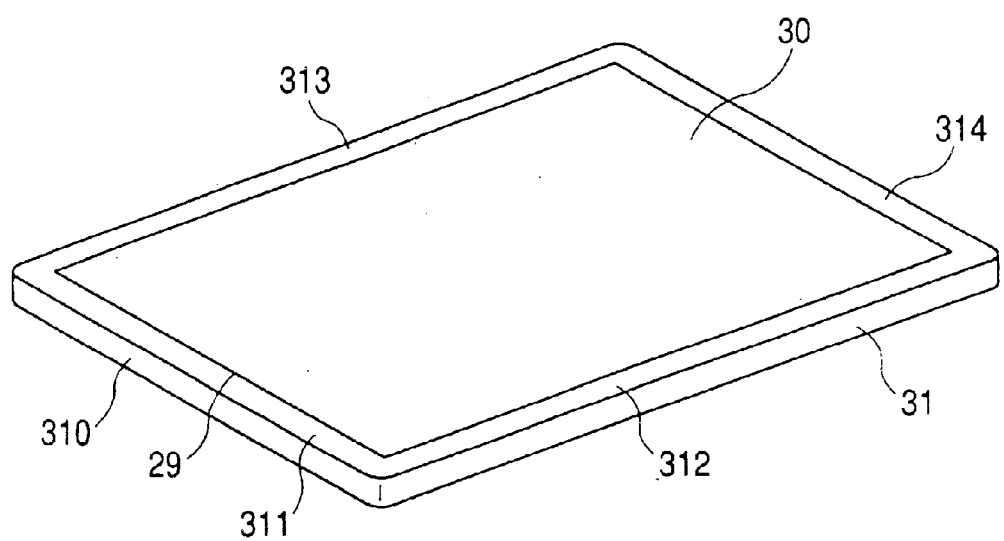
FIG. 4 is a perspective view of an example of an ID card on the surface of which the lamination is completed.

Referring to FIG. 1, a temperature detection device 124, composed of a contact type temperature element such as a thermistor, for example, is attached to the heat roller 20, slidably in contact with a surface of the heat roller 20, being supported by a support plate 120. Another temperature detection device 125, also composed of a contact type temperature element such as a thermistor, for example, is attached to the heat roller 21, slidably in contact with a surface of the heat roller 21, being supported by a support plate 121. Surface temperatures of the heat rollers 20 and 21 are controlled respectively to be a value suitable for the material of an ID card to be laminated, based on temperature information obtained by the temperature detection devices 124, 125. The ID card laminated by the heat rollers 20, 21 is transferred through rollers 22, 23 to be discharged from an outlet 252. An example of an ID card 31 on the surface of which the lamination is completed is shown in FIG. 4.

Figure 5:
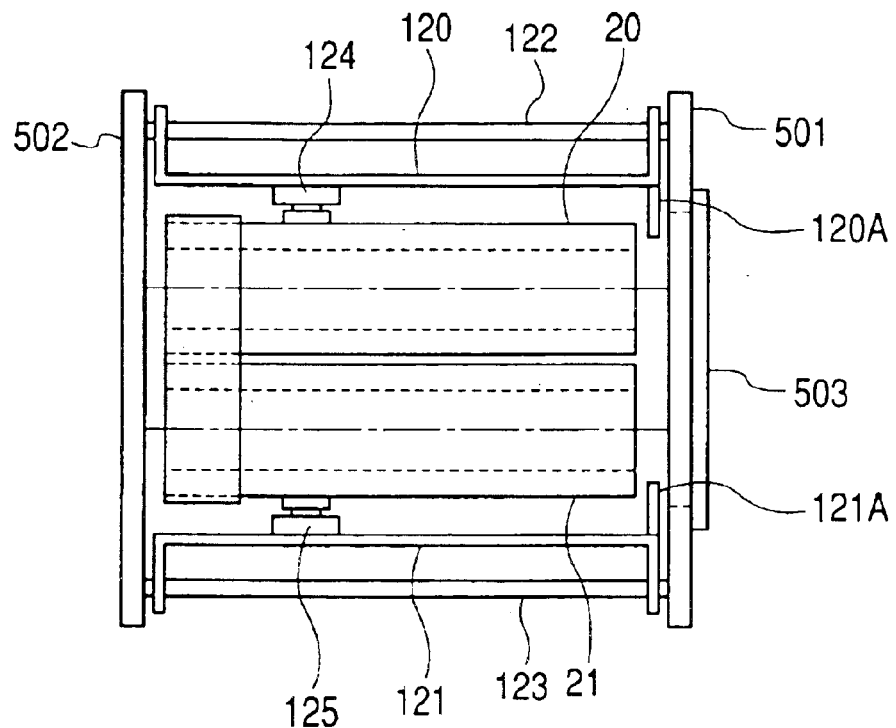
FIG. 5 is a front view of a heat roller attaching/detaching device according to an embodiment of the present invention.
Figure 6:
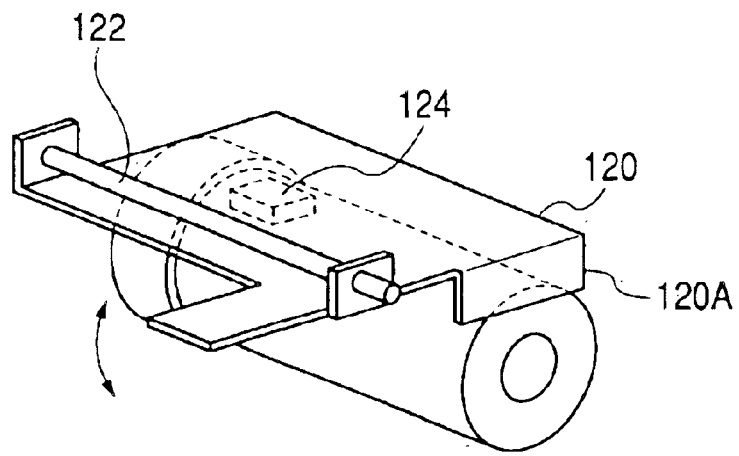
FIG. 6 is a perspective view of the upper half of the heat roller attaching/detaching device shown in FIG. 5.

FIG. 5 is a front view of a heat roller attaching/detaching device, looked from the direction indicated by an arrow F in FIG. 1, according to an embodiment of the present invention. FIG. 6 is a perspective view of the upper half of the heat roller attaching/detaching device shown in FIG. 5.

The temperature detection device 124 is attached to the support plate 120 so as to be elastically and slidably in contact with the surface of the heat roller 20. Also, the temperature detection device 125 is attached to the support plate 121 so as to be elastically and slidably in contact with the surface of the heat roller 21. The support plate 120 is supported rotatably by an axis 122, and the support plate 121 is supported rotatably by an axis 123. These axes 122, 123 are respectively parallel to the rotational axes of the heat rollers 20, 21, and are attached respectively to frame structures 501, 502 of the lamination system 1. When lamination is carried out, the support plates 120, 121 are fixed respectively to frame structures 501, 502 with screws, for example (not illustrated), so as to make the temperature detection devices 124, 125 contact slidably with the respective surfaces of the heat rollers 22, 21. When the heat roller 20 or the heat roller 21 is to be detached from the installed position for cleaning, for example, the support plate 120 or the support plate 121 is rotated around the axis 122 or the axis 123 so as to make the temperature detection device 124 or the temperature detection device 125 placed apart from the heat roller 20 or the heat roller 21, and then is fixed with a screw, for example (not illustrated). Since the upper half and the lower half of the heat roller attaching/detaching device are symmetrical with each other, the following explanation for the attaching/detaching operation is made for the upper half of the heat roller attaching/detaching device shown in FIG. 6. The attaching/detaching operation for the lower half of the heat roller attaching/detaching device is similar to that for the upper half, and the explanation is omitted.

When the heat roller 20 is to be detached from the lamination system 1, a cap 503 (FIG. 5) is removed from the frame structure 501 first. Then, the support plate 120 is turned counterclockwise around the axis 122 until a side plate 120A is positioned in a place in which the heat roller 20 can be removed, and then, is fixed with a screw, for example (not illustrated). The temperature detection device 124 is placed apart from the heat roller 20 being turned with the support plate 120. Then, the heat roller 20 is drawn out of the installed position. Since the temperature detection device 124 is placed apart from the heat roller 20, the latter can be drawn out of the installed position without giving damage to the former.

When the heat roller 20 is to be attached to the lamination system 1, the heat roller 20 is placed in the predetermined installed position. Then, the support plate 120 is turned clockwise around the axis 122 until the temperature detection device 124 contacts with the surface of the heat roller 20, and then, is fixed with a screw, for example (not illustrated). At this time, since the side plate 120A is positioned opposing to the side end surface of the heat roller 20, the side plate 120A prevents the heat roller 20 from running out of the installed position. After that, the cap 503 is attached to the frame structure 501.

Thus, by the heat roller attaching/detaching device according to the embodiment of the present invention, the heat roller 20 can be easily attached to, or detached from, the lamination system 1 without giving damage to the temperature detection device 124.

Figure 7:
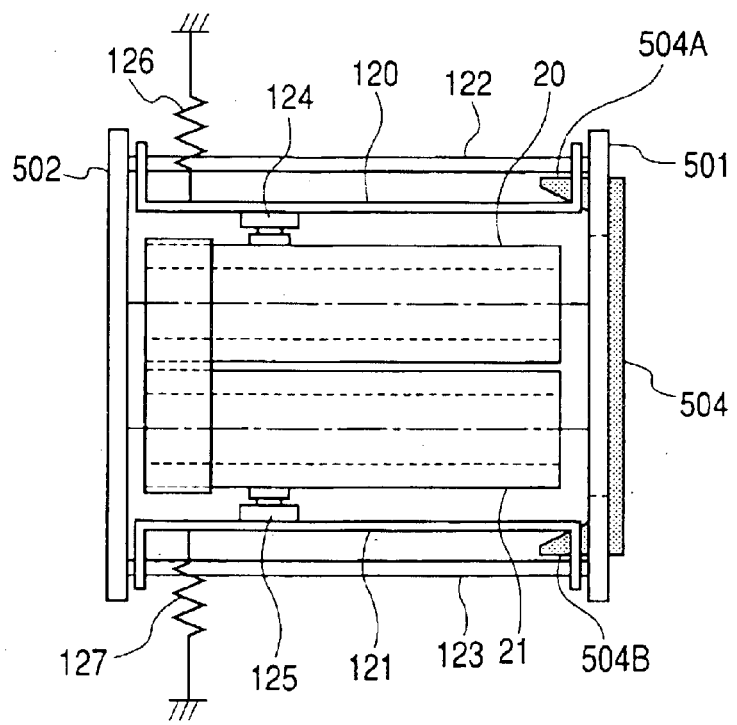
FIG. 7 is a front view of another heat roller attaching/detaching device according to another embodiment of the present invention.

FIG. 7 is a front view of another heat roller attaching/detaching device, looked from the direction indicated by an arrow F in FIG. 1, according to another embodiment of the present invention. The temperature detection device 124 is attached to the support plate 120. Also, the temperature detection device 125 is attached to the support plate 121. The support plate 120 is supported rotatably by an axis 122, and the support plate 121 is supported rotatably by an axis 123. These axes 122, 123 are respectively parallel to the rotational axes of the heat rollers 20, 21, and are fixed respectively to the frame structures 501, 502 of the lamination system 1. The support plate 120 is provided with a spring 126 that urges the support plate 120 to turn to place the temperature detection device 124 apart from the heat roller 20. Also, the support plate 121 is provided with a spring 127 that urges the support plate 121 to turn to place the temperature detection device 125 apart from the heat roller 21. A removable cap 504 is attached to the frame structure 501. The cap 504 has guide teeth 504A, 504B for turning the support plates 120, 121 opposing to the spring forces of the springs 126, 127, when the cap 504 is attached to the frame structure 501, so as to make the temperature detection devices 124, 125 contact respectively with the surfaces of the heat rollers 20, 21.

In this embodiment, when the heat roller 20 and/or the heat roller 21 are/is to be detached, the cap 504 is removed from the frame structure 501 first. Then, the support plates 120, 121 are released from the guide teeth 504A, 504B of the cap 504 and are turned by the spring forces of the springs 126, 127. Consequently, the temperature detection devices 124, 125 are placed apart respectively from the heat rollers 20, 21. Thus, the heat roller 20 and/or the heat roller 21 can be easily detached from the lamination system 1 without giving damage to the temperature detection devices 124, 125.

When the heat rollers 20, 21 are to be attached, they are placed in the predetermined installed position first. Then, the cap 504 is attached to the frame structure 501. When the cap 504 is attached, the guide teeth 504A, 504B of the cap 504 engage respectively with the support plates 120, 121 to turn them to approach respectively to the heat rollers 20, 21, opposing the spring forces of the springs 126, 127. Consequently, the temperature detection devices 124, 125 are made to contact respectively with the surfaces of the heat rollers 20, 21. Thus, the heat rollers 20, 21 can be easily attached to the lamination system 1 without giving damage to the temperature detection devices 124, 125.

Now, transfer and cutting process of the laminate film in the lamination system 1 according to the embodiment of the present invention is explained. The transfer and cutting process in connection with the film transfer path 240 and that in connection with the film transfer path 241 are similar to each other, so the explanation is made only for the process in connection with the film transfer path 240.

Referring to FIG. 1, the laminate roll 2 is loaded on the supply spindle 3 of the lamination system 1. The continuous laminate film of which leading edge is drawn out from the laminate roll 2 is successively cut and transferred along the film transfer path 240.

Figure 8:
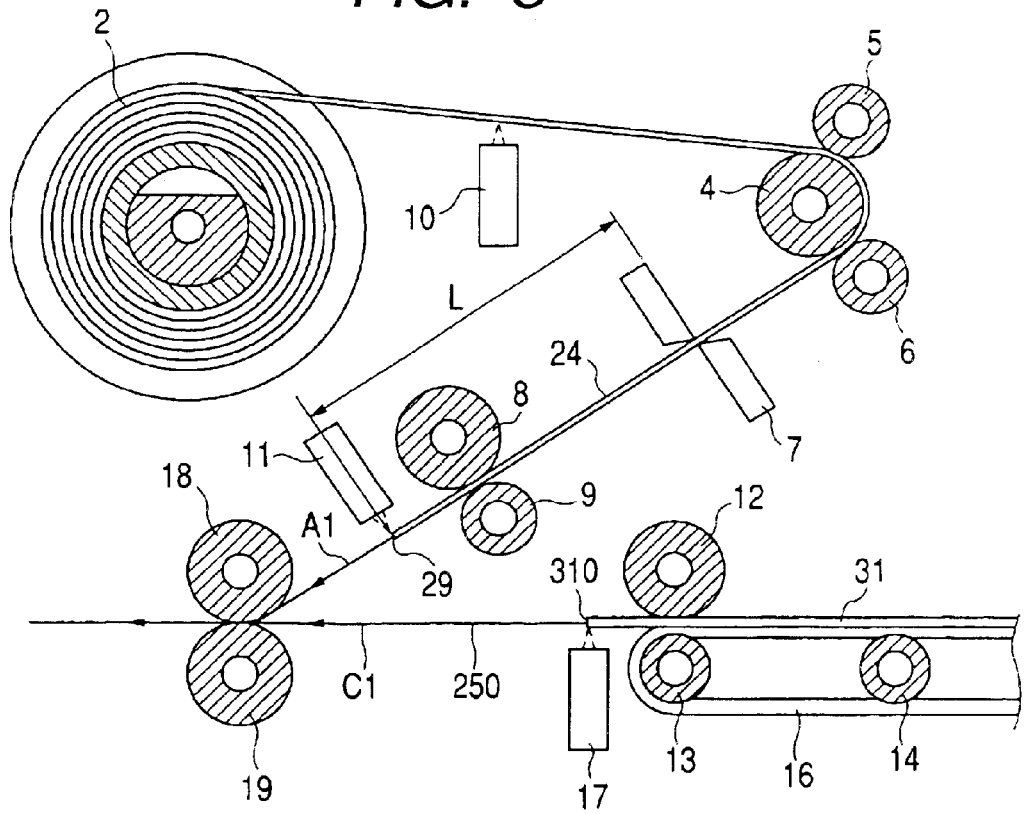
FIG. 8 is a partial schematic view of the lamination system according to the embodiment of the present invention, immediately before the laminate film is cut.
Figure 9:
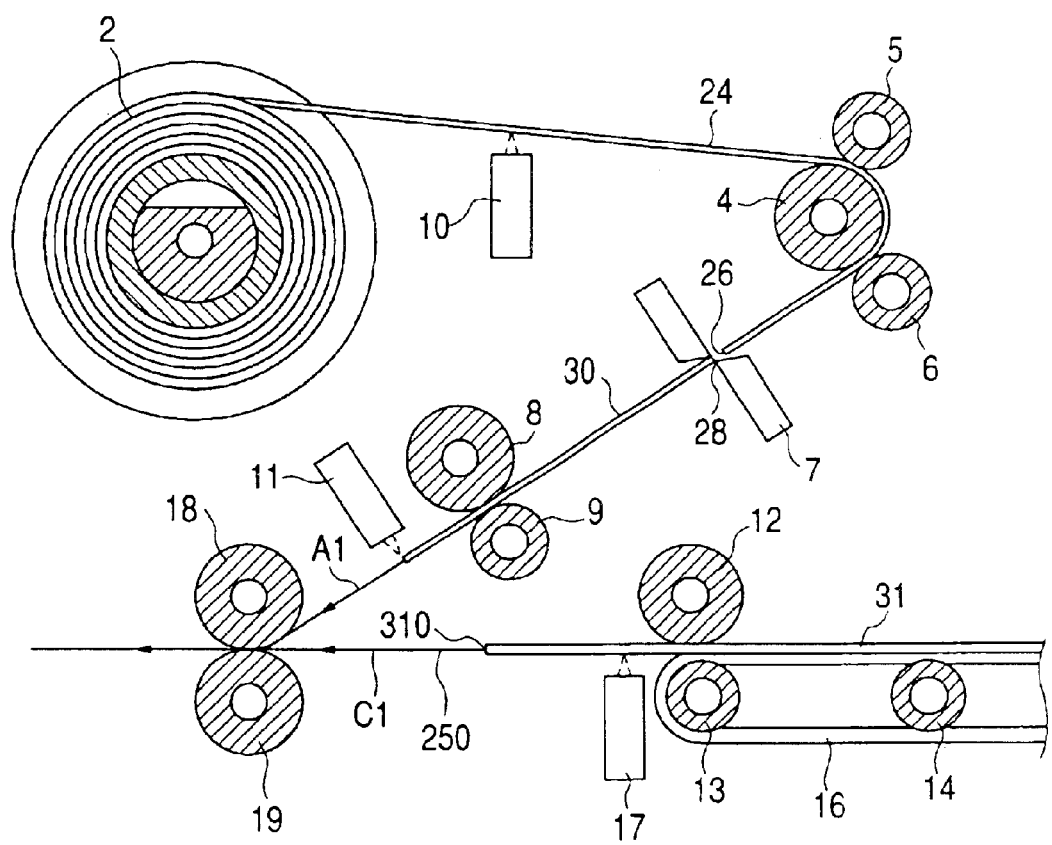
FIG. 9 is a partial schematic view of the lamination system according to the embodiment of the present invention, immediately after the laminate film is cut.

FIG. 8 is a schematic front view of a part of the lamination system 1 according to the embodiment of the present invention, immediately before the laminate film is cut. FIG. 9 is a schematic front view of a part of the lamination system 1 according to the embodiment of the present invention, immediately after the laminate film is cut.

At the start, both the laminate load electric clutch 408 and the laminate feed electric clutch 418 (FIG. 1) are made "connected" state capable of transmitting the drive force.

The leading edge 29 of the continuous laminate film 24 drawn out from the laminate roll 2 is transferred passing through between the blades of the cutter 7 being driven by the drive force of the laminate film transfer motor 405 (FIG. 1). When the leading edge 29 of the continuous laminate film 24 is detected by the film detection sensor 11, the output signal of the film detection sensor 11 is activated. Based on the change in the output signal of the film detection sensor 11, the lamination system 1 judges that the length of the continuous laminate film 24 existing between the cutter 7 and the film detection sensor 11 has become a predetermined length L to be cut, and stops the laminate film transfer motor 405 to stop momentarily the transfer of the continuous laminate film 24. Then, the cutter 7 is driven to make the cut laminate film 30 having the predetermined length L on the film transfer path 240.

After that, the laminate load electric clutch 408 (FIG. 1)is made "disconnected" state, and then, the laminate film transfer motor 405 is rotated again. Then, the drive force of the laminate film transfer motor 405 is transmitted to the rollers 8 and 9 through the laminate feed electric clutch 418, and the cut laminate film 30 is transferred, in the direction indicated by an arrow A1, to the point of convergence composed of the rollers 18, 19.

Next, the cut and transferred laminate film 30 for a top of the ID card, as well as the cut and transferred laminate film for a back of the ID card transferred along the film transfer path 24, are respectively laid on the top and the back of the ID card 31 at the point of convergence. Then, they are bonded simultaneously by thermocompression bonding using the heat rollers 20, 21 (FIG. 1).

Figure 10:
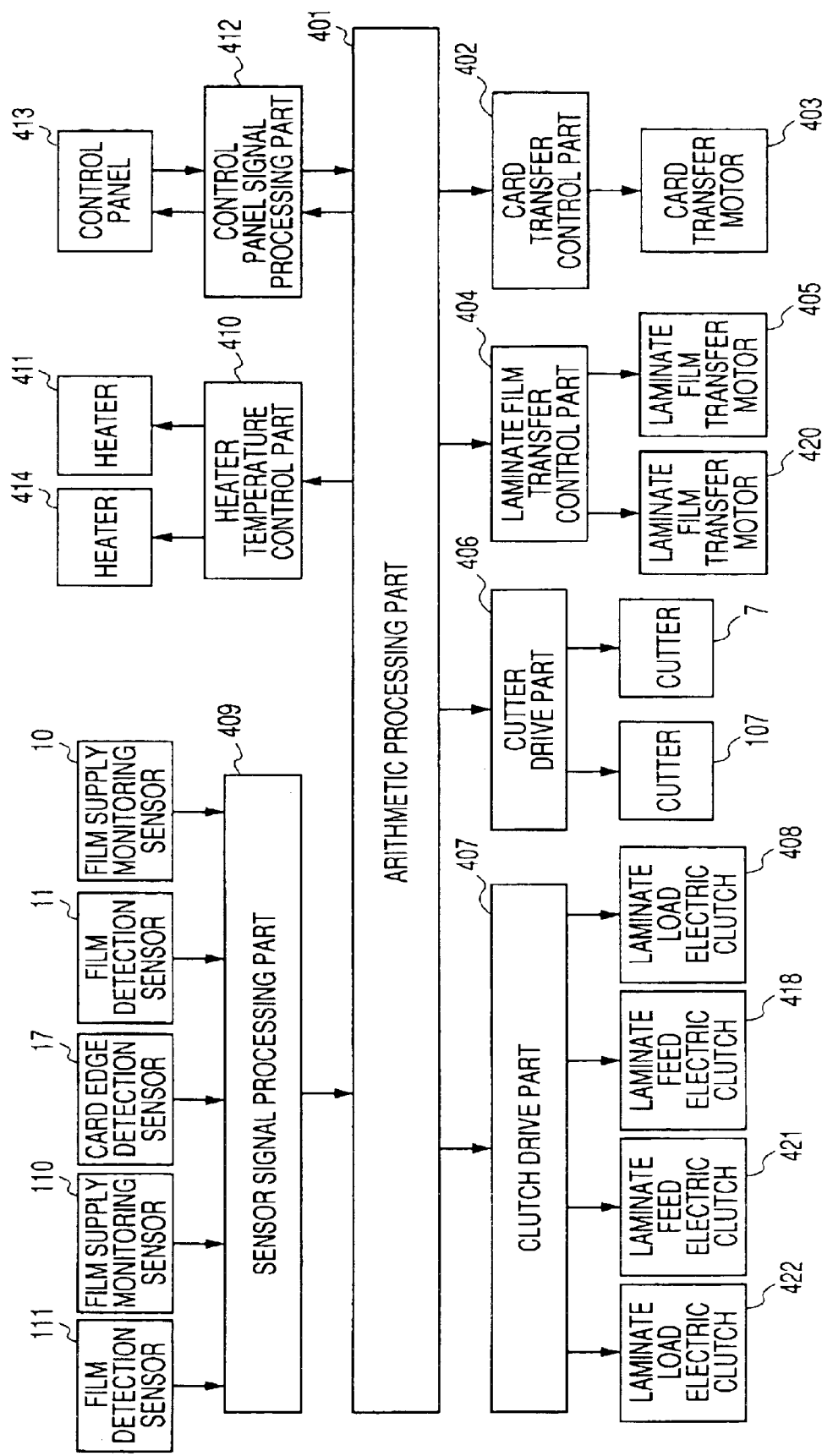
FIG. 10 is a block diagram of a controller for controlling the lamination system according to the embodiment of the present invention.

FIG. 10 is a block diagram of a controller for controlling the lamination system 1 according to the embodiment of the present invention.

The controller comprises; an arithmetic processing part 401 constituting the central portion and composed of micro processors for example, a card transfer control part 402, the card transfer motor 403, a laminate film transfer control part 404, the laminate film transfer motors 405, 420, a cutter drive part 406, the cutters 7, 107, a clutch drive part 407, the laminate load electric clutches 408, 422, the laminate feed electric clutches 418, 421, a sensor signal processing part 409, the film supply monitoring sensors 10, 110, the film detection sensors 11, 111, the card edge detection sensor 17, a heater temperature control part 410, heaters 411, 414, a control panel signal processing part 412 and a control panel 413.

The laminate load electric clutch 408 connects or disconnects driving force of the laminate film transfer motor 405 to the roller 4 (FIG. 1). The laminate feed electric clutch 418 connects or disconnects driving force of the laminate film transfer motor 405 to the roller 8 (FIG. 1). Similarly, the laminate load electric clutch 422 connects or disconnects driving force of the laminate film transfer motor 420 to the roller 104 (FIG. 1). The laminate feed electric clutch 421 connects or disconnects driving force of the laminate film transfer motor 420 to the roller 108 (FIG. 1). Additionally, the roller 5 and the roller 6 (FIG. 1) are connected to the roller 4 through gears attached to the respective shafts (not illustrated). Also, the roller 8 and the roller 9 are connected with each other through gears attached to the respective shafts (not illustrated). Similarly, the roller 105 and the roller 106 (FIG. 1) are connected to the roller 104 through gears attached to the respective shafts (not illustrated). Also, the roller 108 and the roller 109 are connected with each other through gears attached to the respective shafts (not illustrated). The rollers provided along the card transfer path 250 are driven by the drive force of the card transfer motor 403.

Operation of the controller is as follows.

First, the arithmetic processing part 401 makes, through the laminate film transfer control part 404, the laminate film transfer motor 405 rotate to draw out the continuous laminate film 24. At the same time, the arithmetic processing part 401 makes, through the clutch drive part 407, the laminate load electric clutch 408 and the laminate feed electric clutch 418 "connected" state. Then, the roller 4 and the roller 8 are rotated being synchronized with each other, and the laminate film 24 is transferred until the leading edge 29 (FIG. 2) reaches a responsive position of the film detection sensor 11. When the leading edge 29 of the laminate film 24 reaches the responsive position of the film detection sensor 11, the output signal of the film detection sensor 11 becomes activated. The activated output signal is transmitted through the sensor signal processing part 409 into the arithmetic processing part 401.

The arithmetic processing part 401 stores temporarily the point at which the activated signal is transmitted as a position information in an internal memory. The position information is referred to later as a reference point for laying the cut laminate film on the printed ID card when the printed ID card is transferred being synchronized with the transfer of the laminate film.

When the arithmetic processing part 401 receives the activated sensor signal, it stops the rotation of the laminate film transfer motor 405. At the same time, the arithmetic processing part 401 drives the cutter 7, through the cutter drive part 406, to cut the laminate film 24.

After that, the arithmetic processing part 401 makes the cut laminate film 30 transferred in the direction indicated by an arrow A1 in FIG. 9.

The process explained above is also carried out similarly for the drive system of the film transfer path 241.

On the other hand, the leading edge 310 of the printed ID card 31 is detected by the card edge detection sensor 17, the output signal of which is transmitted to the arithmetic processing part 401 through the sensor signal processing part 409. This signal is temporarily stored as the position information in the internal memory of the arithmetic processing part 401 and referred to as the reference point for the succeeding control of the transfer of the printed ID card 31.

Thus, the printed ID card 31 is transferred along the card transfer path 250 shown in the direction indicated by an arrow C1 (FIGS. 8, 9). The amount of the transfer of the printed ID card 31 is controlled by the rollers such as the roller 12 connected to the card transfer motor 403 that is controlled by a command pulse signal.

Similarly, the cut laminate films are also transferred along the film transfer path 240 or the film transfer path 241 (FIG. 1) respectively, being synchronized with the transfer of the printed ID card 31.

Each of the cut laminate films is laid on the top or the back of the printed ID card 31 respectively at the point of convergence of the film transfer path 240, the film transfer path 241 and the card transfer path 250. Then the cut laminate films and the printed ID card 31 are transferred to the place between the heat roller 20 and the heat roller 21 (FIG. 1) provided at the downstream. The heat rollers 20, 21 are provided respectively with the temperature detection devices 124, 125 for measuring surface temperatures of these rollers. Thus, the surface temperatures of the heat rollers 20, 21 are controlled respectively to be the optimum values for lamination by the heater temperature control part 410, and the cut laminate films 30 are bonded respectively on the top and the back surfaces of the printed ID card 31.

FIG. 4 is a perspective view of an example of an ID card on the top of which the lamination is completed. As shown in the drawing, the cut laminate film 30 is laminated on the top of the printed ID card 31 with substantially uniform blank spaces 311 to 314, respectively along four sides of the printed ID card 31, for preventing the cut laminate film 30 from peeling off from the surface of the card. Similar lamination is also made on the back surface (not illustrated) of the printed ID card 31.

In the above explained lamination system 1 according to the embodiment of the present invention, the card transfer motor 403 and the laminate film transfer motors 405, 420 are provided separately. However, these motors can be replaced by a single motor connected to the respective rollers through a plurality of electric clutches.

Also, although the explanation is made for a case in which the reflective type optical sensors are used as the sensors for detecting such as the laminate film and the printed ID card, sensors of other types can be used in place of the reflective type optical sensors.

Additionally, PVC are being generally used as the materials of the ID card to be laminated. The lamination system according to the present invention can also be used for a card made of a composite material such as PET-G, and further, the lamination system can be used for any card regardless of the material of which the card is made.

Further, the object to be laminated by the lamination system according to the present invention is not limited to an ID card. The lamination system is applicable to a lamination of a continuous film, being successively cut, on a substrate in the form other than ID card. The idea of the present invention can be applied even to a lamination system, such as mentioned in the description of the prior art, in which "pre-cut laminate films" on the carriers are used.

The present invention can also be applied to a single-side lamination system in which one of the film transfer paths 240, 241 is omitted, and the similar merits can also be achieved.

What is claimed is:

1. A lamination system comprising a thermocompression bonding means for bonding laminate films, each having a heat adhesive layer, on top and/or back surfaces of cards, applying heat and pressure using a pair of heat rollers, wherein contact type temperature detection devices for detecting surface temperatures of said heat rollers and a heat roller attaching/detaching device for attaching or detaching said heat rollers are provided, said heat roller attaching/detaching device places said temperature detection devices in contact with surfaces of said heat rollers when said heat rollers are being installed in said lamination system, and places said temperature detection devices apart from said heat rollers when said heat rollers are to be attached to, or detached from, said lamination system.

2. The lamination system according to claim 1, wherein said heat roller attaching/detaching device comprises support plates for supporting said temperature detection devices respectively, and each of said support plates is attached rotatably around an axis parallel to the rotational axis of each of said heat rollers.

3. The lamination system according to claim 2, wherein each of said support plates has a side plate opposing to a side end surface of corresponding said heat roller, and said side plate prevents said heat roller from running out of the installed position.

4. The lamination system according to claim 1, wherein;
said heat roller attaching/detaching device comprises support plates for supporting said temperature detection devices respectively and a cap attached removably to a frame structure of said lamination system, each of said support plates is attached to said frame structure rotatably around an axis parallel to the rotational axis of each of said heat rollers, each of said support plates is provided with a spring that urges said support plate to turn to place said temperature detection device apart from said heat roller, and said cap has guide teeth for turning said support plates opposing to the spring forces of said springs, when said cap is attached to said frame structure, so as to make said temperature detection devices contact respectively with the surfaces of said heat rollers.

5. The lamination system according to claim 1, wherein said temperature detection device comprises a thermistor temperature transducer.

6. The lamination system according to claim 2, wherein said temperature detection device comprises a thermistor temperature transducer.

7. The lamination system according to claim 3, wherein said temperature detection device comprises a thermistor temperature transducer.

8. The lamination system according to claim 4, wherein said temperature detection device comprises a thermistor temperature transducer.

* * * * *